(12) United States Patent
Zachrisson et al.

(10) Patent No.: US 11,854,213 B2
(45) Date of Patent: Dec. 26, 2023

(54) METHOD AND SYSTEM FOR GLINT CLASSIFICATION

(71) Applicant: Tobii AB, Danderyd (SE)

(72) Inventors: Joakim Zachrisson, Danderyd (SE); Simon Johansson, Danderyd (SE); Mikael Rosell, Danderyd (SE)

(73) Assignee: Tobii AB, Danderyd (SE)

( * ) Notice: Subject to any disclaimer, the term of this patent is extended or adjusted under 35 U.S.C. 154(b) by 52 days.

(21) Appl. No.: 17/544,881

(22) Filed: Dec. 7, 2021

(65) Prior Publication Data

US 2022/0180532 A1    Jun. 9, 2022

(30) Foreign Application Priority Data

Dec. 8, 2020 (SE) .................... 2051433-7

(51) Int. Cl.
*G06T 7/246* (2017.01)
*G06T 7/73* (2017.01)
*G02B 3/08* (2006.01)
*G06F 3/01* (2006.01)
*H04N 23/56* (2023.01)

(52) U.S. Cl.
CPC ............... *G06T 7/246* (2017.01); *G02B 3/08* (2013.01); *G06F 3/013* (2013.01); *G06T 7/73* (2017.01); *H04N 23/56* (2023.01); *G06T 2207/30168* (2013.01); *G06T 2207/30201* (2013.01)

(58) Field of Classification Search
CPC ....... G02B 27/0093; G02B 3/08; G06F 3/013; G06T 2207/30168; G06T 2207/30201; G06T 7/246; G06T 7/73; H04N 23/56

USPC ............................................. 348/78
See application file for complete search history.

(56) References Cited

U.S. PATENT DOCUMENTS

| 10,288,879 B1 | 5/2019 | Rana et al. |
| 2019/0129174 A1 | 5/2019 | Perreault |
| 2019/0253700 A1 | 8/2019 | Torneus et al. |

(Continued)

FOREIGN PATENT DOCUMENTS

| WO | 2019228634 | 12/2019 |
| WO | WO-2019228634 A1 * | 12/2019 | ............ A61B 3/113 |

OTHER PUBLICATIONS

Swedish Search Report and Written Opinion of Swedish App. No. 2051433-7, dated Jul. 26, 2021.

(Continued)

*Primary Examiner* — Christopher S Kelley
*Assistant Examiner* — Ana Picon-Feliciano
(74) *Attorney, Agent, or Firm* — Christopher Ignatius Moylan

(57) ABSTRACT

An eye tracking system comprises at least one illuminator and at least one image sensor configured to produce an image of an eye of a user, the image including illuminator light reflected from the eye of a user. A Fresnel lens is positioned between the image sensor and the eye of the user, through which the image sensor views the eye. Processing circuitry receives an image from the image sensor, identifies glints in the image, assigns an angular position to each glint based on an angular relationship between each glint and a centre of the Fresnel lens and determines how many glints have the same angular position. Glints are classified as false glints if more than a predetermined number of glints have the same angular position.

18 Claims, 3 Drawing Sheets

(56) References Cited

U.S. PATENT DOCUMENTS

2020/0192475 A1    6/2020   Gustafsson et al.
2020/0257358 A1    8/2020   Rosell et al.

OTHER PUBLICATIONS

European Search Report in EP Appl. No. 21213027.2, completed on Apr. 14, 2022, published on Jun. 15, 2022.

\* cited by examiner

METHOD AND SYSTEM FOR GLINT CLASSIFICATION

CROSS-REFERENCE TO RELATED APPLICATION

The present application claims benefit to Swedish patent application No 2051433-7, filed Dec. 8, 2020, entitled "METHOD AND SYSTEM FOR GLINT CLASSIFICATION", and is hereby incorporated by reference in its entirety.

TECHNICAL FIELD

The present disclosure generally relates to the field of eye tracking. In particular, the present disclosure relates to systems and methods for use in identifying reflections from optical arrangements in an eye tracking system.

BACKGROUND ART

In eye tracking applications, digital images are retrieved of the eyes of a user and the digital images are analysed in order to estimate the gaze direction of the user. There are different methods for achieving such an estimation. In some methods ambient light is used when retrieving images of the eyes of the user and in some methods additional light sources, commonly referred to as "illuminators", are used to illuminate the eyes for retrieving images of the eyes of the user. Generally, the estimation of the gaze is based on identification of the pupils of the eyes of the user, together with identification of corneal reflections, known as "glints", in the eyes of the user.

One known method of eye tracking includes the use of infrared light and an image sensor. The infrared light is directed towards the pupil of a user and the reflection of the light is captured by an image sensor. Through analysis of the reflection point, the direction of the user's gaze may be calculated. One such system is described in U.S. Pat. No. 7,572,008 (which is hereby incorporated by reference in its entirety).

Portable or wearable eye tracking devices have also been previously described. One such eye tracking system is described in U.S. Pat. No. 9,041,787 (which is hereby incorporated by reference in its entirety). A wearable eye tracking device is described using illuminators and image sensors for determining gaze direction.

For some cases, problems can arise through reflection caused by hardware in the eye tracking devices themselves. For example, where lenses are used in the eye tracking devices, the lenses themselves may cause reflections to be present in images received by the image sensor.

It would be desirable to provide an eye tracking device that can account for such situations and where reflections introduced by device hardware can be mitigated for to improve accuracy and/or precision of eye tracking.

STATEMENTS OF INVENTION

According to a first aspect, there is provided an eye tracking system comprising: at least one illuminator; and at least one image sensor configured to produce an image of an eye of a user, the image including light received from the at least one illuminator reflected from the eye of a user; the eye tracking system further comprising: a Fresnel lens positioned between the image sensor and the eye of the user, through which the image sensor views the eye; and processing circuitry configured to: receive an image from the image sensor; identify glints in the image; assign an angular position to each glint based on an angular relationship between each glint and a centre of the Fresnel lens; determine how many glints have the same angular position; and classify a glint as a false glint if more than a predetermined number of glints have the same angular position.

A glint, in this case, is defined as a bright spot in the image, caused by light reflected from the illuminators. The bright spots may be direct reflections of the illuminators from the cornea of the eye of the user, which are desirable glints, or may be reflections or refractions of the illuminator light in the lens itself, which leads to undesirable, or false glints. It is these false glints that need to be classified in order to be ignored during further processing of the eye tracking system. In particular, false glints may be caused by light from the illuminators that are reflected in eyeglasses worn by the user and then reflected and/or refracted in the lens.

A system is thereby provided that allows a computationally light way in which to classify glints as being false glints through simple processing of an image captured by the image sensor.

The processing circuitry may be provided as, for example, one or more controllers or processors within a device containing the image sensor and illuminators. Therefore, the processing operations performed by the processing circuitry may be carried out locally on the device. Alternatively, the processing circuitry may be remote to the device containing the image sensor and illuminators. In this situation, one or more host devices may contain the processing circuitry within which the processing operation are performed. In another example, the processing circuitry may be split across the device containing the image sensor and illuminators and one or more remote devices, allowing the processing steps to be distributed across the device and remote devices.

The angular position may be defined relative to a predetermined reference line. Providing a predetermined reference line allows easy calculation of the angular position of each glint. The position of the predetermined reference line may be constant in each image taken by the image sensor.

Each angular position may be provided as a discrete angular range. By making the angular position a discrete angular range, it can be ensured that glints do not need to have the exact same angular relationship with the lens centre in order to be classed as being in the same angular position. This allows for tolerances in manufacturing and also slight inaccuracies in processing and image capture to be mitigated out of the calculations.

Each angular range may be 5 degrees or less, 3 degrees or less, or 1 degree or less. In one embodiment, a full circle of angles is divided into 360 integer angle bins. Having integer values for each angle provided simple handling and angle mapping to indexes in the data structure.

The predetermined number of glints may be 3. Alternatively, the predetermined number of glints may be 2, or may be 4, or may be 5, or may be 6, or may be 7. The predetermined number of glints may be any integer number greater than 1 selected by the operator of the system. The higher predetermined number of glints used, the less likely it will be that a real glint is incorrectly classified as a false glint.

Glints present within a predetermined area around the lens centre may be excluded from being classified as being false glints. It has been found that glints within a predetermined area around the lens centre are less likely to be false glints than those outside this predetermined area. Thus, by excluding these glints from being classified as false glints, incorrect false glint determinations may be limited or prevented.

The predetermined area around the lens centre may be a circular area with a predetermined or parameterised radius centred in the lens centre. The predetermined area may be, for example, a circle with a radius of 50 pixels.

Glints present within a predetermined area around a pupil centre may be excluded from being classified as being false glints. It has been found that glints within a predetermined area around the pupil centre are less likely to be false glints than those outside this predetermined area. Thus, by excluding these glints from being classified as false glints, incorrect false glint determinations may be limited or prevented.

The predetermined area around the pupil centre may be a circular area with a predetermined or parameterised radius centred in the pupil centre. The predetermined area may be, for example, a circle with a radius of 50 pixels.

Glints excluded from being classified as false glints, either from being within the predetermined area around the lens centre or from being within the predetermined area around the pupil centre, may be excluded from the determination of how many glints have the same angular position.

Alternatively, glints excluded from being classified as false glints, either from being within the predetermined area around the lens centre or from being within the predetermined area around the pupil centre, may be included in the determination of how many glints have the same angular position.

The eye tracking system may confirm that false glints are present by measuring a difference between glints that are considered to be false. If the glints are within a certain distance of each other, the glints may be confirmed as false. Otherwise, the glints may be declassified from being false.

According to a second aspect, there is provided a head-mounted device comprising: a display; and an eye tracking system comprising: at least one illuminator: and at least one image sensor configured to produce an image of an eye of a user, the image including light received from the at least one illuminator reflected from the eye of a user; the eye tracking system further comprising: a Fresnel lens positioned between the image sensor and the eye of the user, through which the image sensor views the eye and the user views the display; and processing circuitry configured to: receive an image from the image sensor; identify glints in the image; assign an angular position to each glint based on an angular relationship between each glint and a centre of the Fresnel lens; determine how many glints have the same angular position; and classify a glint as a false glint if more than a predetermined number of glints have the same angular position.

The head-mounted device may include any one or more of the additional features described in relation to the first aspect.

According to a third aspect, there is provided a method of identifying false glints in an eye tracking system, the method comprising: capturing an image of an eye of a user from an image sensor, wherein the image sensor views the eye of the user through a Fresnel lens, the image including light received from at least one illuminator reflected from the eye of the user; identifying glints in the image; assigning an angular position to each glint based on an angular relationship between each glint and a centre of the Fresnel lens; determining how many glints have the same angular position; and classifying a glint as a false glint if more than a predetermined number of glints have the same angular position.

The angular position may be defined relative to a predetermined reference line.

Each angular position may be provided as a discrete angular range. Each angular range may be 5 degrees or less, or 3 degrees or less, or 1 degree or less.

The predetermined number of glints may be 3.

Glints present within a predetermined area around the lens centre may be excluded from being classified as false glints.

Glints within a predetermined area around a pupil centre may be excluded from being classified as false glints.

Glints excluded from being classified as false glints may be excluded from the determination of how many glints have the same angular position.

Glints excluded from being classified as false glint may be included in the determination of how many glints have the same angular position.

According to a fourth aspect, there is provided a computer-readable storage medium storing computer-executable instructions that, when executed by an eye tracking system, cause the eye tracking system to perform the method of the third aspect.

BRIEF DESCRIPTION OF THE DRAWINGS

Specific embodiments will now be described in detail with reference to the accompanying drawings, in which.

DETAILED DESCRIPTION

Figure 1:
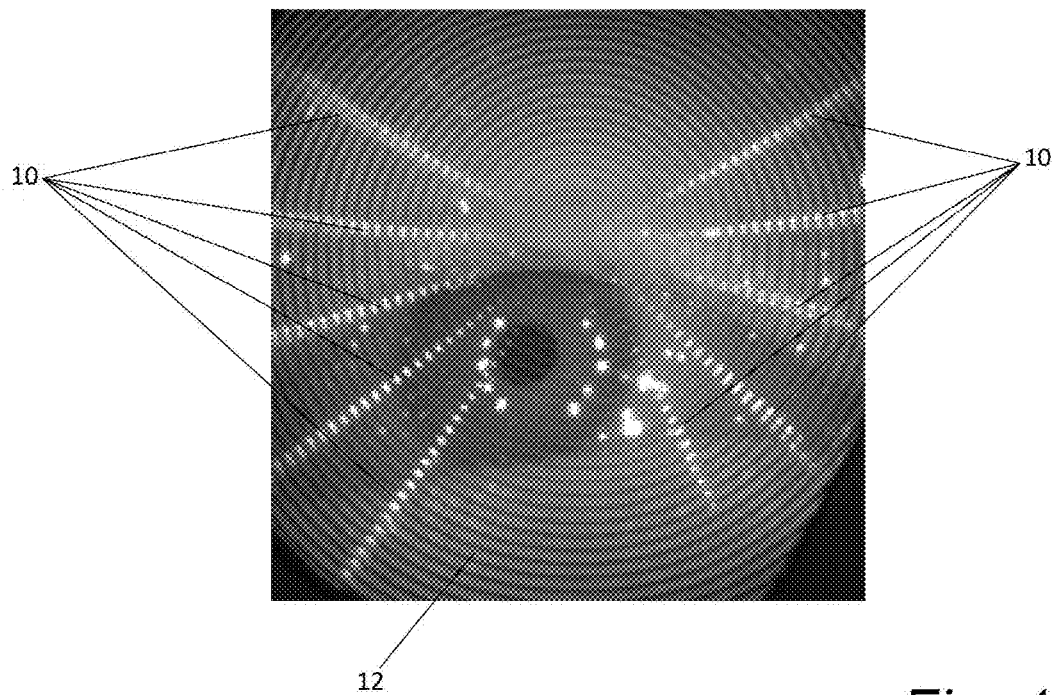
FIG. 1 is an image of an eye of a user, the image featuring glints formed by interaction with a Fresnel lens.

The applicant has noted that, where an image sensor views the eye through a Fresnel lens, illuminators can cause characteristic patterns to become present in the image. These patterns 10 are visible in FIG. 1. The patterns 10 are the result of multiple glints being formed due to interaction of the reflected light with the rings of the Fresnel lens 12. These glints, caused by interaction with the lens 12, are detrimental to eye tracking as they may be wrongly interpreted as desirable glints and used to compute a gaze direction and/or a gaze origin of a user.

The characteristic pattern is that false glints, i.e. those glints that are not direct reflections from the eye of the user, tend to be present in straight lines emanating radially from the centre of the Fresnel lens. This is due to the Fresnel lens consisting of multiple concentric rings about a lens centre. The invention therefore utilises this phenomenon in order to detect and classify false glints within an image of an eye generated by an eye tracker.

Figure 2:
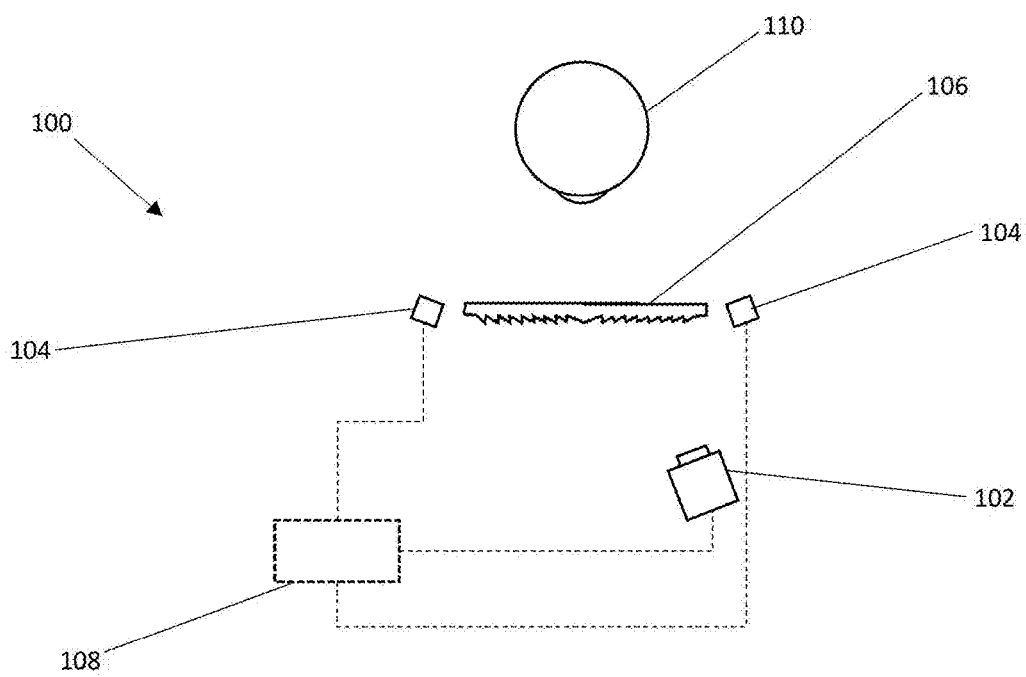
FIG. 2 is a simplified schematic view of an eye tracking system according to the first aspect.

FIG. 2 depicts an embodiment of an eye tracking system 100, which may also be referred to as a gaze tracking system. The eye tracking system 100 is shown in a simplified form, and additional components may be present in other embodiments. The eye tracking system 100 comprises an image sensor 102, two illuminators 104, a Fresnel lens 106 (hereinafter "lens"), and processing circuitry 108. The lens 106 is positioned between the image sensor 102 and an eye 110 of a user, such that the image sensor 102 views the eye 110 of the user through the lens 106. The processing circuitry 108 is in communication with the image sensor 102 such that it can receive an image of the eye 110 of the user from the image sensor 102. The processing circuitry 108 also controls the illuminators 104, although these may in other embodiments be controlled by separate processing circuitry or may not be controlled at all.

The illuminators 104 are generally light emitting diodes (LEDs) configured to emit infrared (IR) or near-infrared (NIR) light. Light of these wavelengths may be invisible, partially visible, or otherwise non-distracting to the user. Two illuminators 104 are shown in FIG. 2, for illustrative purposes, but a greater or lesser number of illuminators 104 may be present any embodiments of the present invention. For example, a single illuminator 104 may be provided, or multiple illuminators 104 may be provided. In common embodiments, eight, ten, or twelve illuminators 104 may be arranged around the periphery of the eye.

The image sensor 102 may be an image sensor of any type, such as a complementary metal oxide semiconductor (CMOS) image sensor or a charge coupled device (CCD) image sensor. The image sensor 102 may comprise an integrated circuit containing an array of pixel sensors, each pixel containing a photodetector and an active amplifier. The image sensor is capable of converting light into digital signals. In some examples, the image sensor may be an infrared image sensor, an RGB sensor, an RGBW sensor, or an RGB or RGBW sensor with IR filter.

The processing circuity 108 includes a receiver for receiving the images from the image sensor 102. The processing circuitry 108 may, for example, be connected to the image sensor 102 and the illuminators 104 via a wired connection and/or a wireless connection. Moreover, the processing circuitry 108 may be collocated with the image sensor 102 and the illuminators 104 or may be located remotely, such as in a different device. In one embodiment, the processing circuitry 108 may be provided together with the image sensor 102.

It is to be noted that the location of the image sensor 102 in FIG. 2 is only for illustrative purposes. The location of the image sensor for an eye in a virtual reality (VR) device such as a virtual reality headset is generally away from the line of sight for the user in order not to obscure a VR display arranged in the VR device for that eye. This is, for example, enabled by means of so-called "hot mirrors" that reflect a portion of the light and allow the remainder of the light to pass. In some VR devices, hot mirrors are used that reflect infrared light to the image sensor whilst allowing visible light to pass through, allowing the user to see the display.

Figure 3:
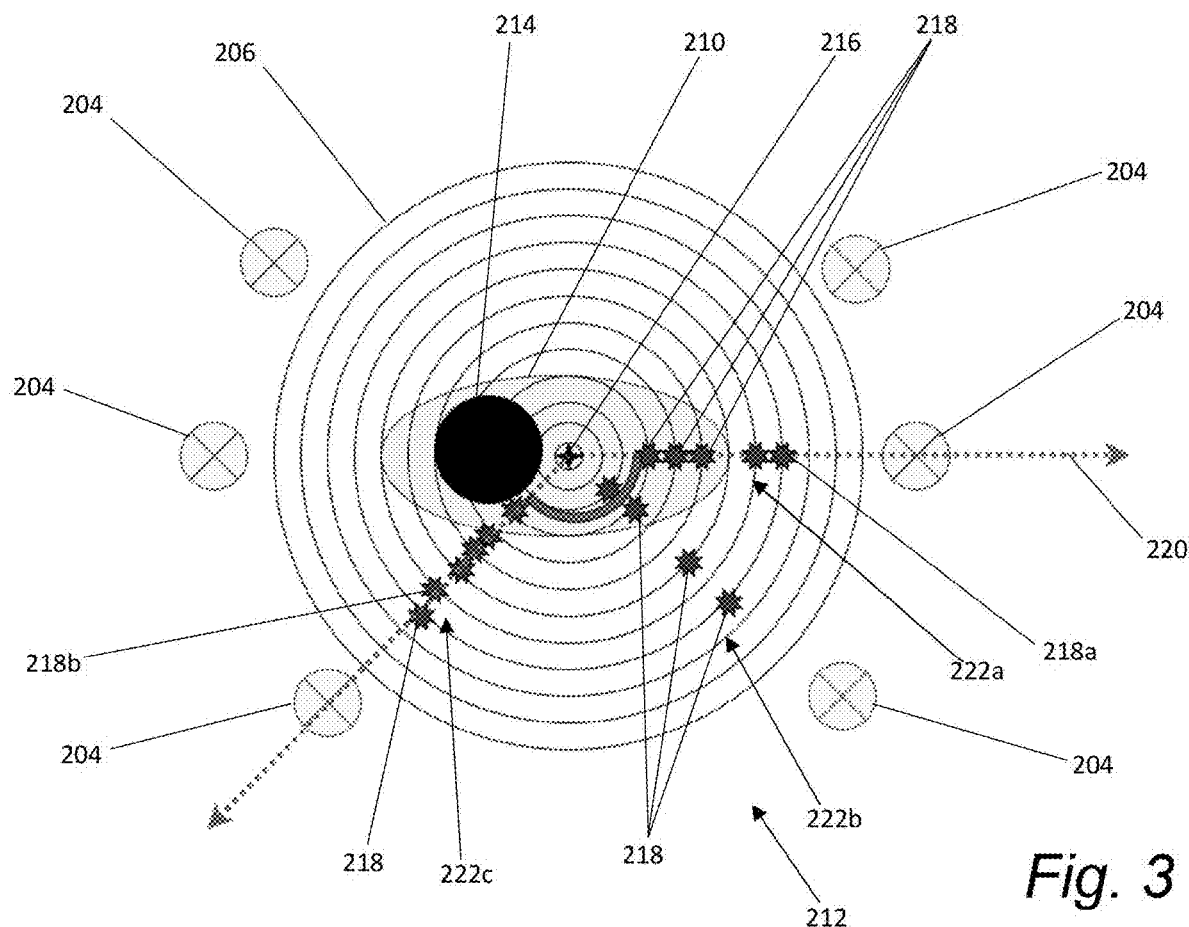
FIG. 3 is an example depiction of the classification of glints using the eye tracking system of the first aspect.

FIG. 3 depicts how glints are classified by an eye tracking system 100 such as that shown in FIG. 2. Any eye tracking system 100 may be utilised to generate the glints, but for reference purposes, the example shown is generated by an eye tracking system 100 similar to that of FIG. 2. The only difference is that a total of six illuminators 204 are used, rather than the two shown in FIG. 2. FIG. 3 may be considered to show an image 212 generated by an image sensor in an eye tracking system similar to that of FIG. 2. However, the illuminators 204 are shown in FIG. 3 only for illustrative purposes and would not be visible in an actual image produced by the image sensor. The depiction of the illuminators 204 in FIG. 3 seeks to illustrate the arrangement of the illuminators around the lens, thus explaining the position of the characteristic refractive pattern present in the image 212.

As can be seen in FIG. 3, a lens 206 is shown, along with an eye 210 of the user, including the pupil 214. The centre of the lens, or lens centre 216, is shown as a "+". The lens centre 216 will be known from the hardware calibration process, due to the fixed relationship between the image sensor and the lens 206, and therefore the lens centre 216 will be in a fixed position for images captured by the image sensor. A number of glints 218 are shown. Whilst a large number of glints are shown, only some of these are labelled, to avoid cluttering of the Figure. For ease of depiction, only false glints are shown in FIG. 3, although it will be clear that, in a real example, the false glints will be accompanied by "real" glints, which are the desirable glints required for eye tracking purposes. However, the detection and classification of false glints occurs in the same manner, whether or not real glints are also present in the image.

Due to the circular shape of the rings of the lens 206, false glints produced by reflection or refraction in the lens 206, rather than reflection off the cornea of the eye 210, form in clusters that radially extend from the lens centre 216. Therefore, in order to classify the glints 218, the present embodiment must first place the glints 218 into groups or clusters. Groups or clusters of false glints will extend radially outward from the lens centre 216. Typically, false glints are produced when some of the illumination produced by the illuminators is reflected into the Fresnel lens from another structure, that may or may not be a part of the eye tracking system itself. For example, if the user wears eyeglasses, light from the illuminators may reflect in the eyeglasses into or onto the lens.

In order to assist with grouping the glints 218, the depicted embodiment utilises a reference position or reference line 220. The reference line 220 may be arbitrarily placed at any radius of the lens 206 but must extend radially from the lens centre 216. In FIG. 3, the reference line 220 extends horizontally rightward from the lens centre 216, as shown. The radial position of the reference line 220 is not important, as it only acts as a datum for future grouping of the glints 218 in the image 212. Whilst the position of the reference line 220 will affect the relative position of the glints 218, the relative position is also arbitrary.

The processing circuitry takes the 2-dimensional position of each glint 218 within the image and then assigns each glint 218 with an angular position relative to the reference line 220, dependent on its position. For example, one glint 218a may be provided with a position of 45° (or $$\frac{\pi}{4}$$

radians), whilst another glint 218b may be provided with a position of 135° (or $$\frac{3\pi}{4}$$

radians). Each glint 218 will therefore be characterised as having an angular position relative to the reference line 220 of somewhere between 0° and 360° (or between 0 and $2\pi$ radians). As will be apparent, the distance from the lens centre 216 to each glint 218 is not relevant to this process. Once an angular position has been determined for each glint 218, the glints 218 can be grouped. Any measurement of angular position may be used. In the present embodiment, the measurements are in degrees or radians, but any other measure may be used instead. For example, it may be preferable to divide the circle into 256 parts, such that the angular position can be provided as an eight-bit value. Other options will be clear to those skilled in the art and are not intended to be limited by the examples described here.

Grouping of the glints 218 may be effected using their discrete angular position. For example, all glints 218 computed as having an angular position of 45° may be grouped together. However, in practice, it may be beneficial to allow grouping of glints 218 that differ from each other by a small angular amount. For example, glints 218 may be grouped that have angular positions of 45°±2.5° (or 42.5° to 47.5°), and a separate group may be provided for glints 218 with angular positions of 40°±2.5° (or 37.5° to 42.5°) and 50°±2.5° (or 47.5° to 52.5°). It may be desirable for each glint 218 to be placed into only a single group, in which case the angular ranges will not overlap. However, in other embodiments, the angular ranges may be allowed to overlap, and the algorithm used to classify the glints may be advanced enough to handle such a situation.

In some situations, it will not be necessary to provide angular ranges for the process of grouping the glints 218. This may depend on the resolution of the determination of the angular position of each glint 218. For example, if the resolution of angular position is only within 5° then all glints 218 in similar angular positions will be grouped together anyway. However, if the resolution is to 0.1°, to take an extreme example, it may be desirable to group glints 218 to allow for slight differences in their angular positions to be taken into account. The grouping of the glints 218 should be small enough to ensure that glints caused by one illuminator are not grouped with glints 218 caused by an adjacent illuminator. Due to tolerances of components and inaccuracies in the computation and processing steps, glints may not be lined up perfectly on a radial line from the lens centre. This may also be affected by the specific design of the lens used.

Once grouped, the total number of glints 218 within each group, or where no groupings are provided, the number of glints 218 at each angular position, can be counted. As will be known to the skilled person, a real, or desirable, glint will be produced by each illuminator, but only a single desirable glint will be produced by a given illuminator, and thus at a given angle. Therefore, where there are multiple glints 218 present at any given angular position, these must be false glints generated by reflection or refraction through the lens. As such, the processing circuitry is configured to count the number of glints 218 within each group, determine if this number is greater than one, and, if so, to classify the glints 218 in this group as false glints. The glints 218 classified as false glints will then be excluded from further processing, in order that they do not affect the determination of gaze position or direction of the user. Although only two glints at an angular position may be used to determine the presence of a false glint, by refraining from classifying glints as false until there are a larger number of glints, such as three, it can be made less likely that the system will wrongly classify a real glint as a false glint.

In some circumstances, the system may require a further step before confirming a glint as being a false glint. In this case, a distance between glints found at a certain angle may be measured. If this distance is below a predetermined value, i.e. the glints are close together, the glints may be confirmed as being false. Alternatively, if the glints are further apart than a predetermined value, the glints may be prevented from being classified as being false.

As can be seen from FIG. 3, in the depicted example there are three sets or groups of glints 222a, 222b, 222c that can be classified as false glints due to the fact that multiple glints 218 are found at specific, or very similar, angular positions: a first group of glints 222a is found at an angular position of 0° from the reference line 220; a second group of glints 222b is found at an angular position of 45° from the reference line 220; and a third group of glints 222c is found at an angular position of 135° from the reference line 220. Each glint 218 within the group of glints 222a, 222b, 222c, due to there being more than three glints 218 in each group, is classified by the processing circuitry as a false glint. The selection of the number three as the value at which it is determined that the glints are false is a value that is selectable dependent on the desires of the user or programmer of the system. For example, the value used to determine the glints may be one, i.e. glints are false if more than one glint is present at a given angular position, or may be two, or three, or any other integer value.

It will be noted that the measurement of angular position in the present example has been executed in a clockwise direction from the reference line 220. This measurement is arbitrary, and the angular position could equally well be measured in an anti-clockwise direction.

Each group of glints 222a, 222b, 222c shown in FIG. 3 consists of a different number of false glints. The first group 222a consists of five glints 218, the second group 222b consists of four glints 218, and the third group 222c consists of six glints 218. Any number of glints may be found within any group, and any group of glints consisting of more than three glints will result in the glints being classified as false glints. It should be noted that there may be some exceptions to this rule, where additional criteria are taken into account prior to classifying glints as false glints, and these will be discussed in more detail below.

In some situations, false glints may not be well-defined and separated from one another, and therefore each individual glint may effectively be merged with adjacent glints, forming a single illuminated mass on the image. An example of such a situation can be seen in the image of FIG. 1, where it is clear that many of the false glints present in each grouping do not have easily distinguishable boundaries.

In such a case, the processing circuitry may determine the number of glints in a group by using a different metric. For example, the processing circuitry may determine a size of the glints, for example using an intensity mass measurement, and divide this by an amount indicative of a glint. This amount may be a predetermined amount or may be determined by analysis of other glints in the image. Alternatively, the processing circuitry may determine the number of glints by measuring the shape of the glint; for example, a glint on an image may be determined to be multiple glints if its aspect ratio—i.e. its length relative to its width—is above a certain value. That certain value may be 2, or 3, or more, for example. Alternatively, where large bright areas are detected, these may not be classified as glints at all. The algorithm used by the system may simply reject large bright areas from being considered to be glints in the first place.

Other methods of determining whether a plurality of glints are present will be known to the skilled person in the context of the present disclosure.

In some embodiments, it may be desirable to provide extra steps for additional stability of the system. These steps are not necessary for functioning of the system but may assist the system with the detection of false glints without incorrectly classifying real glints as false glints.

It may be desirable to override the classifying of glints as false if they are within a predetermined area near the lens centre. The applicant has noted that when glints are found close to the lens centre, the likelihood is that the glint is a real, desirable glint rather than a false glint. Therefore, whilst other glints may exist at the same angular position as such a glint and may be automatically classified as false glints, the glint within the predetermined area near the lens centre is unlikely to be a false glint and should not be classified as such. Thus, by providing a predetermined area around the lens centre wherein no glint is determined to be a false glint, incorrect classifications can be limited or avoided. In some embodiments, this predetermined area around the lens centre may be a circle with a radius of 50 pixels, for example.

In the case where a predetermined area around the lens centre is defined, the glints within the predetermined area may still be included in the determination of whether there are more than the predetermined number of glints at any angular position. Conversely, the glints within the predetermined area may be excluded from the determination of whether there are more than the predetermined number of glints at any angular position.

Additionally or alternatively, it may be desirable to override the classifying of glints as false if they are within a predetermined area around the pupil of the eye of the user. The applicant has noted that when glints are found close to the pupil, the likelihood is that the glint is a real, desirable glint rather than a false glint. Therefore, whilst other glints may exist at the same angular position as such a glint and may be automatically classified as false glints, the glint within the predetermined area around the pupil is unlikely to be a false glint and should not be classified as such. Thus, by providing a predetermined area around the pupil wherein no glint is determined to be a false glint, incorrect classifications can be limited or avoided. In some embodiments, this predetermined area around the pupil of the eye of the user may be a circle with a radius of 50 pixels, for example.

In the case where a predetermined area around the pupil is defined, the glints within the predetermined area may still be included in the determination of whether there are more than the predetermined number of glints at any angular position. Conversely, the glints within the predetermined area may be excluded from the determination of whether there are more than the predetermined number of glints at any angular position.

Embodiments may include predetermined around both the lens centre and the pupil, or may include only one of these predetermined areas, or may include no predetermined areas.

A major advantage of the present disclosure is that a determination of false glints by counting and registering the position of the glints is computationally cheaper than other known methods of classifying glints. As such, the present invention can be implemented to reduce the workload of a processor or to provide other comparable benefits to implementations of eye tracking systems.

Figure 4:
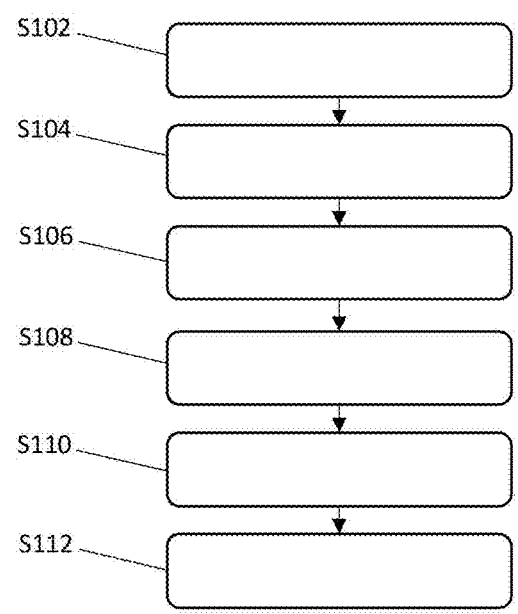
FIG. 4 is a flow diagram of the method according to the third aspect.

FIG. 4 will now be described with in relation to the previously mentioned steps of the method.

In a first step, the image sensor captures S102 an image of an eye of the user. As will be clear from the previous description, the image sensor views the eye through the lens. Moreover, the image sensor receives reflected light that is shone on the eye by the one or more illuminators situated around the lens. Thus, the image includes the eye and reflected light from the illuminators that is reflected in the eye, as well as illuminator light that is otherwise reflected or refracted by the lens.

Glints in the image can then be identified S104. In the embodiment shown, each processing step, such as the identification of glints, is executed by the processing circuitry. Glints in the image may be caused by direct reflection of the illuminator on the cornea of the eye or may be caused by reflection or refraction in the lens.

Each glint is assigned S106 an angular position based on its angular relationship with a centre of the lens. In the earlier depicted embodiment, this angular relationship is determined with reference to an arbitrarily defined reference line. Other datums for measuring the angular position may be known to the person skilled in the art.

In one embodiment, the angular position of each glint may be discretised S108 into an angular range, in order to simplify the next processing steps. For example, the angular positions may be discretised into angular ranges of 5 degrees, or of 1 degree, such that angular positions that are similar are grouped together.

Glints that are identified in a position close to the centre of the lens, or close to a pupil centre, detected by the image sensor, may be omitted from further classification. In essence, these glints are considered to be real due to their position, and therefore it may be desirable to forcibly prevent them from being designated as false glints. This may be performed as a part of step S108 or in a separate step. This step is described in more detail in relation to FIGS. 5a and 5b.

It can now be determined S110 how many glints have the same angular position. In the example of FIG. 3, five glints have an angular position of 0°, four glints have an angular position of 45° and six glints have an angular position of 135°.

Finally, a glint S112 can be classified as false if more than a predetermined number of glints have the same angular position, i.e. if more than the predetermined number are in the same grouping. Referring again to FIG. 3, if the predetermined number is three, then each of the three groups has more than three glints and therefore all of the glints shown in the image are classified as false glints.

Figure 5A:
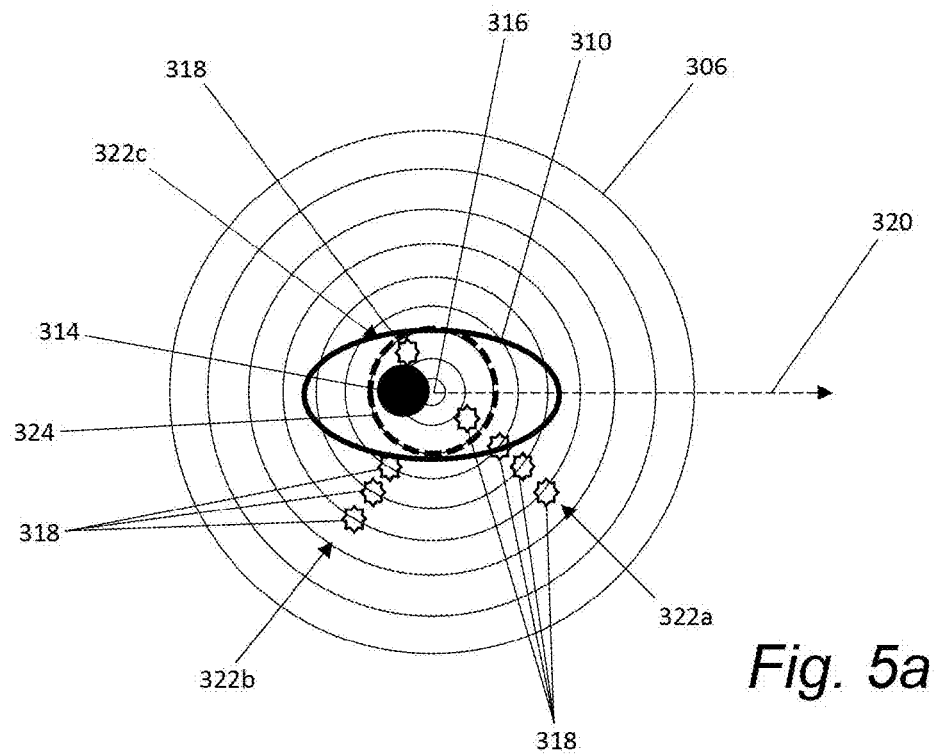
FIGS. 5a and 5b show how the inclusion of predetermined areas around the lens centre and the pupil affect the classification of glints.
Figure 5B:
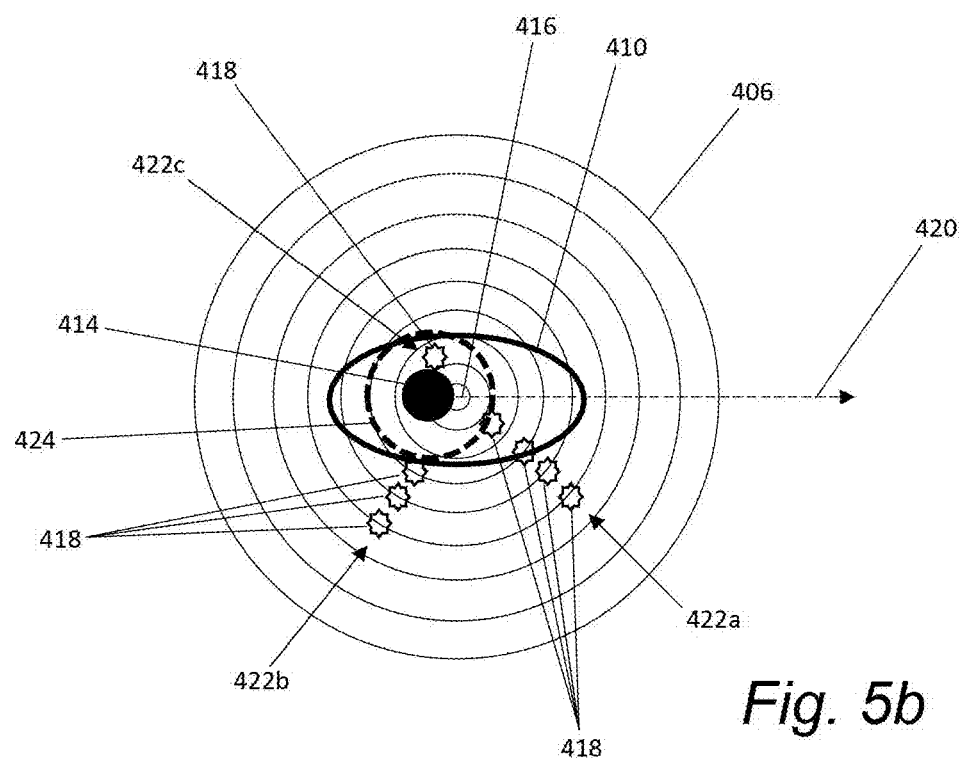

FIGS. 5a and 5b depict the predetermined areas 324, 424 around the lens centre and the pupil, respectively. These images show how the position of the predetermined area 324, 424 affects whether or not glints are prevented from being classified as being false glints. Each of FIGS. 5a and 5b show a depiction of what an image sensor would see, including the Fresnel lens 306, 406, an eye 310, 410, including a pupil 314, 414, and a number of glints 318, 418. In each case, the predetermined area 324, 424 is shown as a dotted line. A reference line 320, 420 is also superimposed on the images, to aid with description.

In both Figures, three sets of glints 318, 418 are shown. A set of four glints 322a, 422a is shown at an angle of approximately 45° from the reference line, a set of three glints 322b, 422b is shown at an angle of approximately 135° from the reference line, and a single glint 322c, 422c is shown at an angle of approximately 225° from the reference line. As the glints 318, 418 are in the same position in each image, differences in classification are solely dependent on the position of the predetermined area 324, 424. Each system is configured to classify glints as false when there are three or more glints 318, 418 present at a particular angle.

In FIG. 5a, the predetermined area 324 is around the lens centre 316. Four glints 318 are present at 45° from the reference line 320. However, the closest of these glints 318 to the lens centre is within the predetermined area 324 around the lens centre 316. Therefore, this glint 318 is prevented from being classified as false. As there remain three glints 318 in the same position that are capable of being classified as false, the system will classify these glints 318 as false. In other embodiments, the system may still count the fourth glint 318, that which is prevented from being classified as false, in the total number of glints 318 in a given position, such that four glints 318 are counted. This would not have any impact in the present case.

The three glints 318 at 135° from the reference line 320 are all outside of the predetermined area 324 around the lens centre 316. As there are three glints 318 at the same angle, these glints 318 will be classified as false.

The single glint 318 at 225° from the reference line 320 is within the predetermined area 324 around the lens centre 316 and is also the only glint 318 at that given position. Thus, this glint 318 will not be classified as false.

In FIG. 5*b*, the predetermined area 424 is around the pupil 414. Four glints 418 are present at 45° from the reference line 420 and all of these are outside of the predetermined area 424 around the pupil 414. Therefore, all of these glints 418 will be classified as being false.

The three glints 418 at 135° from the reference line 420 are all outside of the predetermined area 424 around the pupil 414. As there are three glints 418 at the same angle, these glints 418 will be classified as false.

The single glint 418 at 225° from the reference line 420 is within the predetermined area 424 around the pupil 414 and is also the only glint 418 at that given position. Thus, this glint 418 will not be classified as false.

In these two examples, the predetermined areas 324, 424 have been described separately from one another. However, in some embodiments it may be preferable to provide both predetermined areas 324, 424 in relation to a single system, thus having two predetermined areas 324, 424 within which glints are prevented from being classified as false. The operation of such embodiments is clear in view of the above explanations.

The invention claimed is:

1. An eye tracking system comprising:
   at least one illuminator; and
   at least one image sensor configured to produce an image of an eye of a user, the image including light received from the at least one illuminator reflected from the eye of a user;
   the eye tracking system further comprising:
   a Fresnel lens positioned between the image sensor and the eye of the user, through which the image sensor views the eye; and
   processing circuitry configured to:
   receive an image from the image sensor;
   identify glints in the image;
   assign an angular position to each glint based on an angular relationship between each glint and a centers of the Fresnel lens, wherein each angular position is provided as a discrete angular range;
   determine how many glints have the same angular position; and
   classify a glint as a false glint if more than a predetermined number of glints have the same angular position; and
   exclude the false glint during further processing of the eye tracking system.

2. The eye tracking system according to claim 1, wherein the angular position is defined relative to a predetermined reference line.

3. The eye tracking system according to claim 1, wherein each angular range is 5 degrees of less, or 3 degrees or less, or 1 degree or less.

4. The eye tracking system according to claim 1, wherein the predetermined number of glints is three.

5. The eye tracking system according to claim 1, wherein glints present within a predetermined area around the lens centre are excluded from being classified as false glints.

6. The eye tracking system according to claim 1, wherein glints present within a predetermined area around a pupil centre are excluded from being classified as false glints.

7. The eye tracking system according to claim 5, wherein glints excluded from being classified as false glints are excluded from the determination of how many glints have the same angular position.

8. The eye tracking system according to claim 5, wherein glints excluded from being classified as false glints are included in the determination of how many glints have the same angular position.

9. A head-mounted device comprising:
   a display; and
   an eye tracking system comprising:
   at least one illuminator: and
   at least one image sensor configured to produce an image of an eye of a user, the image including light received from the at least one illuminator reflected from the eye of a user;
   the eye tracking system further comprising:
   a Fresnel lens positioned between the image sensor and the eye of the user, through which the image sensor views the eye and the user views the display; and
   processing circuitry configured to:
   receive an image from the image sensor;
   identify glints in the image;
   assign an angular position to each glint based on an angular relationship between each glint and a centre of the Fresnel lens, wherein each angular position is provided as a discrete angular range;
   determine how many glints have the same angular position; and
   classify a glint as a false glint if more than a predetermined number of glints have the same angular position, and
   exclude the false glint during further processing of the eye tracking system.

10. A method of identifying false glints in an eye tracking system, the method comprising:
    capturing an image of an eye of a user from an image sensor, wherein the image sensor views the eye of the user through a Fresnel lens, the image including light received from at least one illuminator reflected from the eye of the user;
    identifying glints in the image;
    assigning an angular position to each glint based on an angular relationship between each glint and a centre of the Fresnel lens, wherein each angular position is provided as a discrete angular range;
    determining how many glints have the same angular position; and
    classifying a glint as a false glint if more than a predetermined number of glints have the same angular position and
    excluding the false glint during further processing of the eye tracking system.

11. The method according to claim 10, wherein the angular position is defined relative to a predetermined reference line.

12. The method according to claim 10, wherein each angular range is 5 degrees of less, or 3 degrees or less, or 1 degree or less.

13. The method according to claim 10, wherein the predetermined number of glints is three.

14. The method according to claim 10, wherein glints present within a predetermined area around the lens centre are excluded from being classified as false glints.

15. The method according to claim 10, wherein glints present within a predetermined area around a pupil centre are excluded from being classified as false glints.

16. The method according to claim 14, wherein glints excluded from being classified as false glints are excluded from the determination of how many glints have the same angular position.

17. The method according to claim 14, wherein glints excluded from being classified as false glints are included in the determination of how many glints have the same angular position.

18. A non-transitory computer-readable storage medium storing computer-executable instructions that, when executed by an eye tracking system, cause the eye tracking system to perform the method of claim 10.

* * * * *